June 15, 1954  G. T. RANDOL  2,681,221
ROTARY-MOTION RESPONSIVE CONTROL DEVICE
Filed Jan. 31, 1951  2 Sheets-Sheet 1
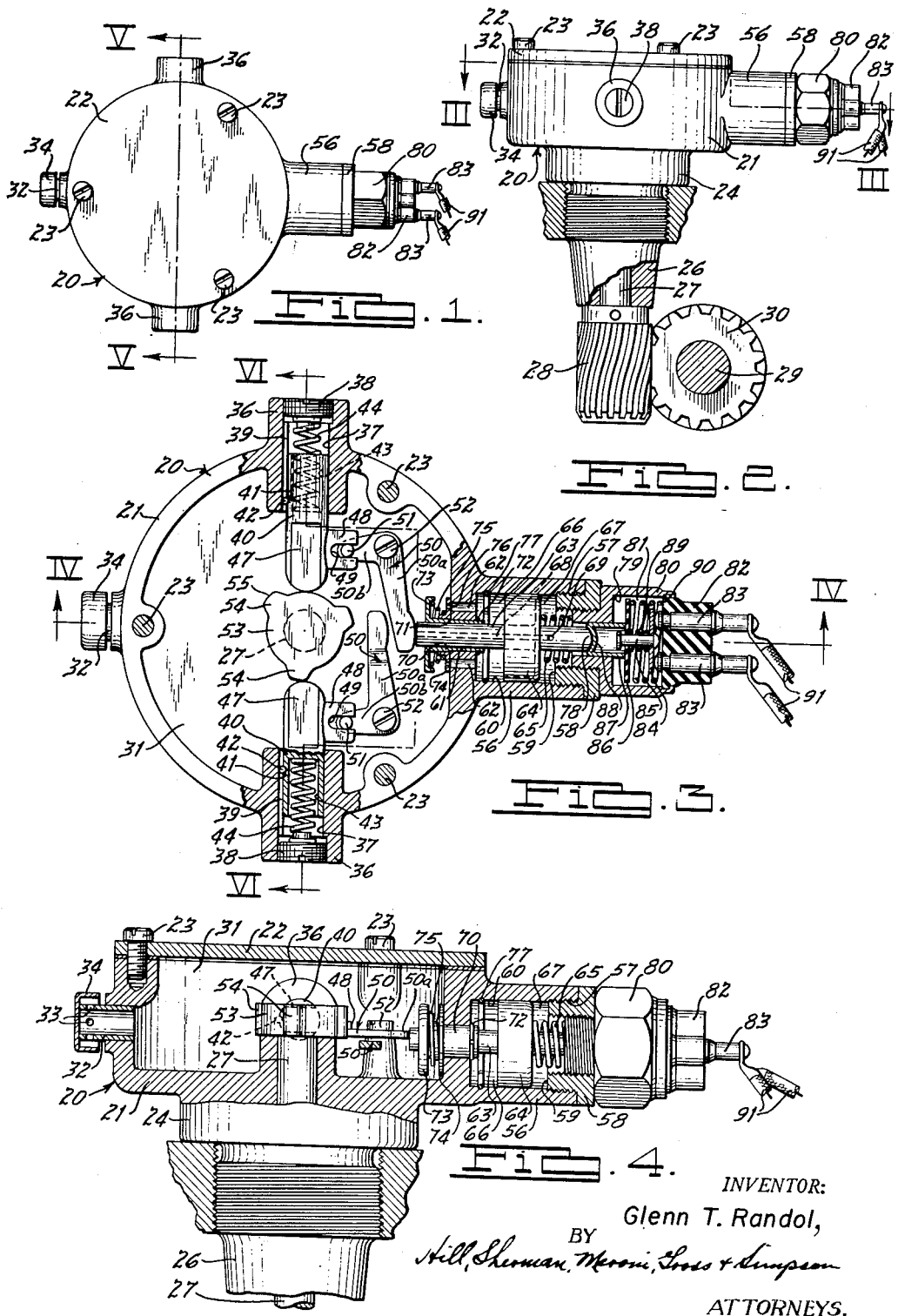
INVENTOR:
Glenn T. Randol,
BY
ATTORNEYS.

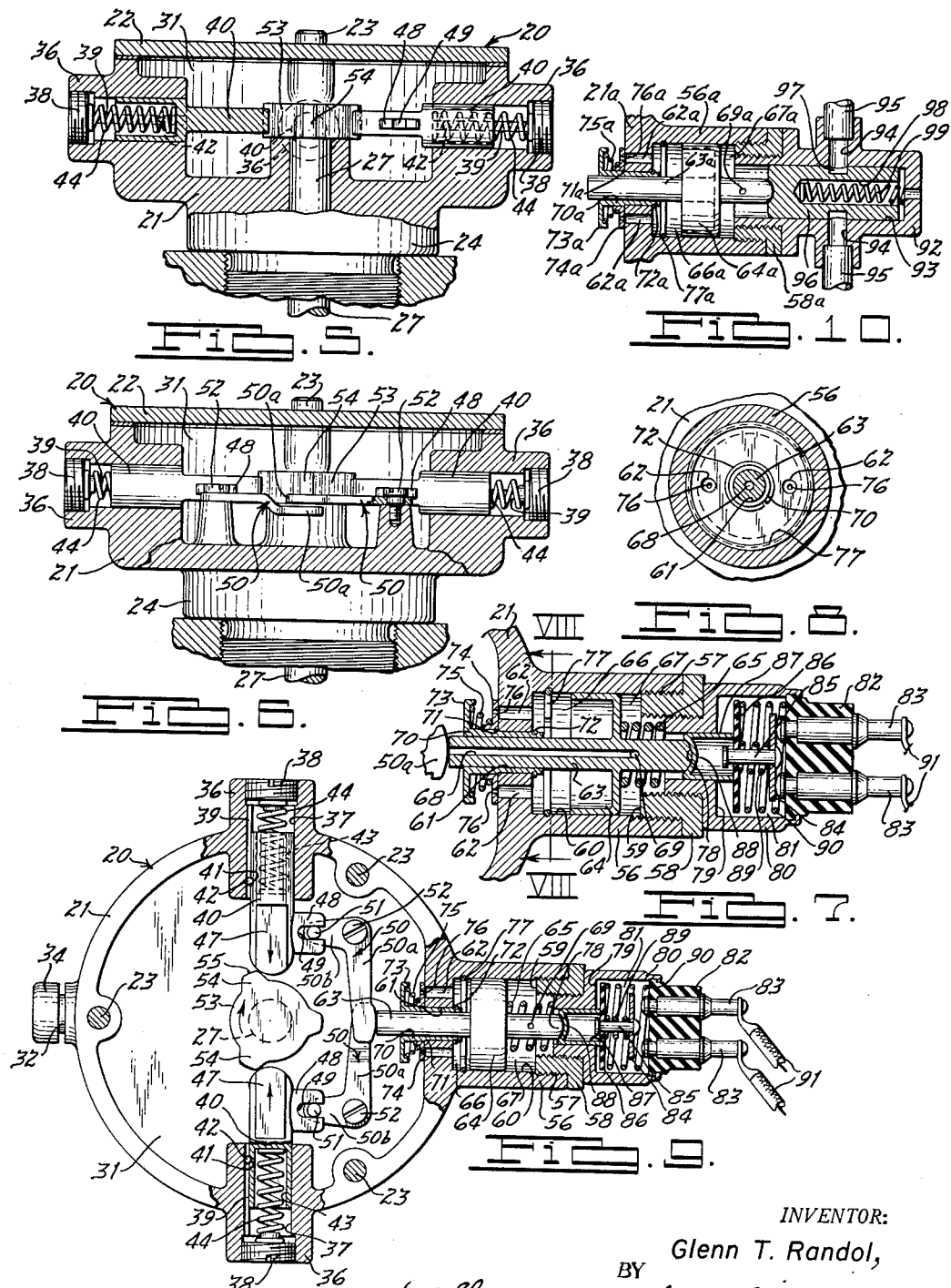

Patented June 15, 1954

2,681,221

UNITED STATES PATENT OFFICE 2,681,221

ROTARY-MOTION RESPONSIVE CONTROL DEVICE

Glenn T. Randol, Mountain Lake Park, Md.

Application January 31, 1951, Serial No. 208,748

20 Claims. (Cl. 264—21)

The present invention relates to control devices, and more particularly to a control device operable in response to the rotary movement only of an element such as a cam, to regulate the controlling function of said device.

The control device of this invention is particularly adapted for controlling the operation of a vehicular drive system in accordance with vehicular speeds translated into rotary movement of a cam member driven by the vehicle. For example, in automatic transmissions for automobiles and like vehicles, it is necessary to disengage the transmission clutch prior to bringing the vehicle to a standstill in order to prevent stalling of the vehicle engine, but such clutch disengagement should occur at very low vehicular speed; e. g., on the order of from 3 to 5 miles per hour, so that the braking effect of the engine may be utilized substantially throughout the decelerating range during stopping of the vehicle. Many similar examples of the necessity of such a low speed control will be evident to those skilled in the art, as, for instance, the activation of various gear sets as the vehicular speed varies in the control of a down shifting cycle.

It will thus be appreciated that closely calibrated, accurate low-speed control is necessary for effective operation of the vehicular drive system. The prior art control devices have typically employed centrifugally actuated weights or the like for regulating initiation of a controlling function. Such earlier devices generally have proved unsatisfactory for accurate regulation under various vehicular operating conditions, particularly at extremely low speeds where the centrifugal effect is slight. As a consequence, there is a need in the art for an accurate control device operable in response to the rotational movement only of an element through a wide range of speeds thereof, and particularly at low speeds, and which may be utilized for the effective control of automatic vehicular transmissions, clutches, and other apparatus.

It is, therefore, an important object of the present invention to provide an improved and novel control device not dependent upon a centrifugal force component for its controlling action.

Another important object of the present invention is to provide a novel control device controllable from a rotatable power source operable at low speeds without the variations inherent in centrifugal actuation.

It is a further important object of the present invention to provide an improved control device in which a reciprocable actuating mechanism is operated by means responsive to the rotary action of a variable-speed source.

Still another important object of the present invention is to provide a novel control device including a reciprocable actuating mechanism which is alternately advanced and retracted by means responsive to the rotary movement only of a variable-speed source.

Another object relating to that next hereabove is the provision of a control device wherein the movement of a reciprocable actuating pin is limited by damping means incorporated in and forming a part of the device.

Yet a further important object of the present invention is to provide a control device wherein a reciprocable actuating pin is utilized for the actuation of a control means upon movement of the pin to an extreme operative position, with the pin being alternately advanced toward and retracted from the extreme position under certain operating conditions by means responsive to the rotary movement only of a variable-speed source.

An additional object related to that next above is the provision of damping means for controllably hindering advancement of the reciprocal actuating means towards its extreme operative position under certain operating conditions.

A further object related to the last two objects above set forth is the provision of fluid pressure dampening means for the reciprocal actuating means including an automatically operable control valve having a restricted orifice adapted to effect a gradual equalization of fluid pressures acting upon the dampening means for causing a retarded movement of said reciprocable actuating means toward its operative position under certain operating conditions.

Still another important object of the present invention is to provide a control device including reciprocable actuating means movable toward and away from an operating position in response to rotation of a power source and subjected to substantially counter-balanced mechanical and fluid pressure-forces for preventing attainment of the operative position except under certain operating conditions.

An additional object of the present invention is to provide a control means actuated by an alternately advanceable and retractable actuating member, advancement of the actuating means being accomplished by rotation of a multi-lobe rotatable cam, and retraction of the actuating means being accomplished by the biasing effect of preloaded spring means operatively energized during advancement of said actuating means.

Yet another object is the provision of a novel control device adapted for association with a motor vehicle change-speed gearing and driven from the output shaft thereof so that the control effected is responsive to the turning movement of the output shaft.

It is a further important object to provide a control device for controlling operation of a mechanism having a rotatable shaft, the device being actuated by the shaft and being effective to control operation of the mechanism by the rotational conditions of the shaft without utilizing any centrifugal component, thereby enhancing the accuracy of the device at low rotational speeds.

Other and further important objects of this invention will be apparent from the disclosures in the specification and the accompanying drawings.

In the drawings:

Figure 1 is an elevational plan view of a control device of the present invention;

Figure 2 is an elevational side view showing the gear-drive for imparting rotational movement to the device;

Figure 3 is a transverse sectional view taken along the plane III—III of Figure 2 and illustrating the device in an extreme operative position;

Figure 4 is a vertical sectional view taken along the plane IV—IV of Figure 3;

Figure 5 is a transverse sectional view taken along the plane V—V of Figure 1;

Figure 6 is a transverse sectional view substantially similar to the view of Figure 5 but taken along the planes VI—VI of Figure 3;

Figure 7 is an enlarged, fragmentary, sectional view of the control means of the device of the present invention;

Figure 8 is a fragmentary transverse sectional view taken along the plane VIII—VIII of Figure 7;

Figure 9 is a sectional view similar to Figure 3 but illustrating another operated position of the device; and Figure 10 is a fragmentary transverse sectional view similar to Figure 7 illustrating a modified form of the control device adapted to control the function of a valve.

Referring to the drawings:

In Figure 1, reference numeral 20 refers generally to a control device of the present invention which includes a generally cylindrical, cup-shaped casing 21 (Figures 2-4, inclusive) having a circular top 22 removably secured to the casing 21 by suitable means, as by screws 23. The bottom wall of the casing is provided with a depending embossment 24 from which projects an integral centrally positioned shank 26 through which projects a drive shaft 27 having a spiral gear 28 keyed or pinned thereto for rotation therewith. The device 20 is preferably mounted, for example, adjacent a propeller shaft 29 carrying a gear or the like 30 meshing with the gear 28. The shaft 29 serves as a source of power for effecting rotation of the operable portions of the control device, and the device may be desirably utilized to control the power rotation of the shaft 29 or of any other associated power-actuated mechanism. As hereinbefore explained, the control device of the present invention is particularly adapted for the control of an automatic transmission and in this case, the propeller shaft 29 will be geared to the spiral gear 28 at the rear of the transmission, so that the rotational speed of the shaft 27 of the control device is proportional to the actual driving speed of the propeller shaft.

Particularly referring now to Figures 1, 2 and 4, it will be seen that the casing 21 defines an interior, generally circular space 31 vented to the atmosphere through an apertured conduit 32, as by apertures 33 in the vertical wall of the casing, which are protected from dust and other impurities by the breather cap 34. Thus, the space 31 is constantly vented to the atmosphere while still being enclosed for cleanliness.

The vertical wall of the casing 21 is also provided with diametrically opposed, radially extending bosses 36 which are integrally formed with the casing and which project both radially into the space 31 and radially outwardly from the corresponding wall surfaces of the casing. These bosses 36 are provided with a central axial bore 37 tapped adjacent its outer extremity to threadedly receive an exteriorly threaded closure cap 38. The bore 37 is provided with an axially extending elongated groove 39 for a purpose to be hereinafter more fully described.

A generally cylindrical cam plunger 40 is mounted in each of the bores 37 for reciprocation therein, each plunger having a detent 41 formed therein for receiving a ball bearing or the like 42 movable in the groove 39 formed in the bore 37 to prevent rotation of the plunger 40 as it is reciprocated within the bore. Each plunger is axially recessed at its outer end, as at 43, for receiving therein a plunger spring 44 bottomed against the associated cap 38 and serving to urge the cam plunger inwardly toward the center of the casing 21.

Each of the plungers 40 has its inward end longitudinally flattened, as at 47, for substantially half their full length, and corresponding side surfaces of the cam plungers carry forked or bifurcated slide brackets 48 having a central elongated slot 49 extending substantially normal to the longitudinal axis of the cam plungers.

A plunger arm indicated generally at 50 is associated with each of the cam plungers, the plunger arms 50 having angularly disposed arm projections 50a and 50b, the shorter projection 50b carrying an upstanding pin 51 entered within the cam plunger projection slot 49 for reciprocation therein. The plunger arms are supported intermediate their length at the juncture of the plunger arm projections 50a and 50b by means of a shouldered screw or the like 52 received by an upstanding boss 53 projecting upwardly and formed integrally with the bottom wall of the casing 21 to project upwardly into the space 31.

The cam plungers 40 are reciprocated and the plunger arms 50 are actuated by means of a rotor cam 53 mounted on the rotatable shaft 27 of the device 20, and which is provided with an uneven number, preferably 3 as illustrated, lobes 54 which project radially from the outer rotor cam surface in circumferentially equally spaced relation. It will be seen that each of the rotor cam lobes 54 have a finite curved outer surface 55 adapted, upon rotation of the shaft 27, to alternately contact the inner ends of the cam plungers 40.

It will be seen that the cam plungers 40 are separated by the rotor cam 53 and that the plungers are adapted to contact the outer surface of the rotor cam or the lobe surfaces 55 projecting radially therefrom. The cam plungers are at their extreme inner position (retracted) when they contact the surface of the cam rotor proper, and the cam plungers are moved radially outwardly (advanced) with respect to the casing upon contact of the cam plunger inner ends with the lobe surfaces 55. Inasmuch as the cam plungers are directly linked to the cam plunger arms 55, by means of the pins 51 reciprocating within the slots 49, rotation of the shaft 27 causes a reciprocation of the cam plungers and a consequent pivoting movement of the arms 50 about the pivot screws 52.

It will also be seen that the rotor cam is so designed that at least one of the cam plungers is always in contact with a cam lobe surface 55 to withdraw the arm projection 50a to its inner position as shown in Figure 3. Also, it is possible for each of the cam plungers to be in contact simultaneously with a side surface of a cam lobe 54 as shown in Figure 9. The force urging the plunger arm projections 50a outwardly to their extreme position relative to the casing is the force of the spring 44 acting upon the associated cam plunger to operate the same into contact with the rotor cam, so that the cam plungers may serve as cam follower members responsive to the action of the cam lobes.

As best seen in Figures 3, 5, 7 and 9, the casing 21 is provided with an additional radially extending embossment 56 which is positioned intermediate the bosses 36 and in diametrically opposed relation to the breather cap 34. The generally cylindrical embossment 56 is provided with an interiorly threaded open outer end 57 which is adapted to receive an exteriorly and interiorly threaded, axially bored cap 58, the inner extremity of the cap 58 defining an interior shoulder 59 partially radially closing an inwardly projecting bore 60 formed in the embossment 56. The bore 60 communicates with the space 31 in the interior of the casing 21 through a central reduced diameter passage 61 and through a pair of opposed passages 62 formed in the corresponding section of the wall of the casing 21.

An actuating pin 63 is provided to project from the space 31 through the central bore 61 into the bore 60 of the embossment 56, the pin 63 being generally cylindrical and having a cupped piston 64 formed intermediate its length for positioning within the embossment bore 60. The piston 64 is in fluid-tight, preferably lapped, surface contact with the walls of the bore 60 so as to subdivide the chamber 60 into a pair of chambers 66 and 67. The chamber 67 constitutes a reaction chamber which is constantly vented to the atmosphere through an axial bore 68 of the actuating pin 63 and a radial cross-bore 69 in full communication with the bore 68. The venting of the chamber 67 to the atmosphere is thus accomplished through the bores 69 and 68 to the space 31 in the interior of the casing 21 which, it will be recalled, is vented to the atmosphere through the conduit 32 and the breather cap 34. The chamber 66 constitutes a damping chamber which also is vented to the atmosphere through the passages 62 formed in the wall of the casing 21 defining the rear end of the bore 60. The pin is urged toward the casing 21, i. e. into the chamber 67 by a return spring 65 acting directly on the piston 64.

The actuating pin 63 is guided for sliding movement within the bore 60 by means of a press-fit bearing sleeve 70 interposed between the actuating pin and the bore 61. The sleeve 70 is provided with an enlarged radial shoulder 71 seated against the wall of the casing 21, and an annular locking ring 72 is seated on the sleeve in the interior of the bore 60 to retain the sleeve in fixed position within the bore 61. The sleeve 70 is provided with a terminal radially enlarged peripheral flange 73 within the casing 21 and in spaced relation to the adjacent wall of the casing 21.

An annular valve plate 74 is slidable along the exterior surface of the sleeve 70 and is urged into air-tight contact with the wall seat of the casing 21 by means of a light conical compression spring 75 interposed between the sleeve flange 73 and the plate 74, said spring also accommodating the unseating of said valve plate. It will be seen that the valve plate 74 overlies the passages 62, and the plate 74 is provided with very small passages or orifices 76 in registry with the relatively larger passages 62, as best seen in Figure 8. The valve plate is held against rotation relative to the passages 62 by means of the conical spring 75 which has its smaller end press-fitted over the hub of the orifice plate 74 and its larger end likewise press-fitted into the annular circumferential edge of the sleeve flange 73. Thus, rotation of the plate 74 is prevented and the metering orifices 76 are maintained in correct registry with the passages 62. It is important to note here that when the valve plate 74 is seated, the orifices 76 restrict the flow of fluid through the passages 62, and when unseated an accelerated rate of fluid flow is accommodated through the passages 62 for purposes which will hereinafter be fully described.

Movement of the piston 64 toward the portion of the wall of the casing 21 separating the bore 60 from the interior space 31 is limited by an annular lock ring 77 positioned in the bore 60, and the extreme forward end 78 of the actuating pin 63 projects forwardly from the bore 60 into a concentric registering bore 79 formed in a cover cap 80 which is exteriorly threaded for threaded engagement with the interior threads of the bored cap 58. The cap 80 serves to load the spring 65 against the piston 64. The cap 80 defines an interior chamber 81 enclosed by an insulating contact carrier 82 preferably formed of plastic or other electrical insulating material and having a pair of conventional electrically conductive fixed contacts 83 embedded therein and projecting therethrough into the chamber 81.

The inner ends of the contacts 83 within the chamber 81 are adapted to be bridged by a conductive contact plate 84 carried by a plate pin or rivet 85 which is slidably received by an insulating carrier plate 86 having a generally cylindrical contact button 87 closed by a concave-convex end wall 88 contacting the end 78 of the actuating pin 63. Sliding movement of the pin 85 relative to the carrier plate 86 is accommodated by a relatively light compression spring 89 interposed therebetween, while the carrier plate 86 is urged toward the closed inner end of the cap 80 by means of a relatively heavier compression spring 90.

It will be seen from the foregoing description that the contact plate 84 is adapted to bridge the gap between the contacts 83 and to close the circuit therebetween, the circuit including lead wires 91 attached to each of the contact pins 83. The spring 89 serves to resiliently retain the contact plate in its position for closing the circuit, despite slight fluctuations in the positioning of the backing plate 86.

*The embodiment of the invention illustrated in Figure 10*

In Figure 10 of the drawings, there is illustrated a modified form of control device of the present invention wherein the control means to be actuated by the control device constitutes a fluid control valve, rather than the electrical switch hereinbefore described in detail. It will be appreciated that the device illustrated in Figure 10 is provided with a casing 21a of substantially the same design as that hereinbefore described, together with the requisite rotor cam, cam plungers and plunger arms for acting upon the actuation pin 63a of this figure, which is substantially identical with the pin hereinbefore described in connection with the earlier embodiment of the present invention.

The actuator pin 63a carries a piston 64a of substantially the same design as that hereinbefore described, and a similar bearing sleeve 70a, orifice valve plate 74a and orifice plate spring 75a are provided. The piston 64a defines a reactive chamber 67a and a damping chamber 66a in substantially the same manner as that hereinbefore described and air is vented into the reactive chamber through an axial bore in the actuating pin 63a and a cross-bore 69a in a manner hereinbefore described. Air is admitted into and out of the damping chamber through passages 62a via damping orifices 67a and unseating of valve plate 74a, respectively, also as hereinbefore described.

In addition, the boss 56a is partially closed by a threaded cap 58a which threadedly receives therein a valve housing 92 defining an interior valve bore 93 communicating through diametrically opposed radial passages 94 with fluid pressure conduits 95, one of which is connected to a suitable source of fluid under pressure and the other is connected to an apparatus, such as a clutch or the like, adapted to be actuated by fluid under pressure. An axially movable valve element 96 is journaled in the valve bore 93 for sliding movement therein, the valve body having an annular circumferential groove 97 for connecting the fluid passages 94, and an axial recess 98 receiving a compression spring 99 bottomed against the closed end of the housing valve 92 and urging the valve element radially inwardly toward the casing 21a in much the same manner as the springs 65 and 90 urge the contact plate 84 from the contacts 83 in that embodiment of the invention previously described. The closed end of the housing 92 is centrally apertured to maintain atmospheric conditions in the chamber formed between the spring end of the valve element 96 and housing end wall, to eliminate pressure modulations tending to affect normal movement of said element.

It will be seen that the embodiment of Figure 10 is illustrated as being at rest in which condition the valve ports 94 are connected via annular groove 97, and actuation of the actuating pin 63a in the manner hereinbefore described has served to control the establishment of registry between the valve annular groove 97 and the valve ports 94.

*Operation*

Assuming now that the control device is substantially at rest, the device will assume the operative position illustrated in Figure 3 and Figure 7. To assume such a position of rest, the propeller shaft or other power source 29 would also be at rest, so that the gear 28 and the shaft 27 keyed thereto are not being rotated.

Initially, it will be noted that the rotor cam 53 is provided with three lobes 54, although any uneven number of equally spaced lobes may be utilized so long as there will be one plunger 40 resting upon the surface of the cam 53 and not upon a cam lobe surface 55, regardless of the rotative position in which the cam 53 is halted. Inasmuch as the cam plunger 40 resting upon the rotor cam 53 is urged thereagainst under the action of the spring 44, this spring will be effective to urge the plunger arm 50 associated with the given plunger about its point of pivoted attachment, namely the shouldered screw 52, so that the plunger arm projection 50a abuts the adjacent end of the actuating pin 63. In this manner, the pin 63 will be actuated radially outwardly from the casing 21 into abutment with the member 87 to urge the contact plate 84 against the electrical contacts 83 to close the circuit including the conductors 91.

This closing action is accommodated because the spring 44 is of a compressive strength greater than the strength of the combined springs 65, 89 and 90 which cooperatively urge the actuating pin to its left-hand position, that is radially inwardly with respect to the casing 21.

It will be seen that the spring 44, in urging the actuating pin to its radially outward position shown in Figure 3, must likewise move the damping piston 64 within the boss bore 60, such movement being accomplished against the compression spring 65 and also against fluid pressure within the reactive chamber 67 (Figure 7). The chamber 67 is constantly vented to atmospheric pressure as hereinbefore explained through the cross-bore 69 and the axial bore 68 of the actuating pin which communicate with the space 31 defined in the casing 21 and vented to the atmosphere through the breather cap 34. In order to equalize pressures within the reactive chamber 67 and the damping chamber 66, it is necessary that air be drawn into the chamber 66 during movement of the piston outwardly of the casing to prevent the formation of a vacuum therein caused by enlargement of the chamber 66 upon piston movement. Such atmospheric pressure is vented to the chamber 66 only through the registering passages 62 and orifices 76 due to the valve plate 74 being held in seated condition by the cooperative actions of the spring 75 and atmospheric pressure thereagainst, and it will be appreciated that the orifices 76 because of their extremely small size, limit the amount of air which can be drawn in, and thereby serve a damping function resisting movement of the piston 64 outwardly of the casing. However, when the device is at rest, such movement of the piston is accommodated due to the relatively greater compressive strength of the spring 44 when compared with the spring 65, the speed of piston movement being reduced by the restriction of air flow into the damping chamber 66.

Further, when the device is substantially at rest, the contact plate 84 is resiliently held against the contacts 83 by means of the spring 89, and it is unnecessary to totally compress the spring 90 acting upon the insulating plate 86.

When the control device is operating at a relatively high rotational speed, i. e., at a speed greater than that at which it is desired to close the circuit including the conductors 91, the shaft 27 will be driven by the propeller shaft or other source of power 29 and the associated gear train 30—28. The cam lobes 54 of the rotor cam 53 will alternately contact the cam plungers 40, thereby withdrawing the plunger arms 50 alternately from their contact with that end of the actuating pin 63 extending into the casing space 31. Thus, the actuating pin is alternately urged radially outwardly from the casing within the bore 60 under the action of the plunger springs 44, and return movement of the actuating pin is accommodated by return movement of the compression springs 65, 90 and 89.

When the actuating pin is in contact with one of the plunger arms 50, the pin is forced radially outwardly from the casing toward that position shown in Figures 3 and 7, but this actuating pin movement is resisted by the springs 65, 89 and 90, and actuating pin movement is further dampened by the fluid pressure resistance afforded by atmospheric pressure within the reactive chamber 67 and less-than-atmospheric pressure in the damping chamber 66. Upon movement of the piston 64 radially outwardly of the casing within the bore 60, any air entering the damping chamber 66 to equalize pressure therein with atmospheric pressure within the reactance chamber 67 must enter the chamber 66 through the small orifices 76 and the passages 62. Due to small size of the orifices 76, pressure within the chambers 66 and 67 will not be immediately equalized upon initial movement of the piston and a delaying or damping action will be exerted upon the piston, which, in combination with the resistance of the springs 65, 89 and 90 will prevent movement of the contact plate 84 to a sufficient degree to close the circuit, including the conductors 81, prior to removal of the arm 50 from contact with the actuating pin upon outward movement of the plungers contacting the cam lobe surfaces 55.

When the arms 50 are momentarily removed from contact with the associated end of the actuating pin 63, the combined efforts of the springs 65, 89 and 90 are no longer opposed by the greater force of one of the springs 44, and these springs force the piston 64 radially inwardly toward the casing. Inward movement of the piston will increase the pressure within the damping chamber 66, and this greater pressure will open (unseat) the valve plate 74 against the action of plate spring 75, so that such fluid under pressure may more rapidly escape from the damping chamber through the passages 62 which are no longer covered by the valve plate. Thus, air leakage about the valve plate may occur and relatively rapid movement of the piston 64 and the actuating pin 63 radially inwardly toward the casing 21 is accomplished.

Due to the difference in speed between the radially outward movement of the pin 63 against the atmospheric pressure within the reactive chamber 67 and the lessened pressure within the damping chamber 66, and radially inward movement under the influence of the spring 65, 89 and 90 and where the pressures within the chambers 66 and 67 are utilized, it will be seen that when the rotor cam 53 is rapidly rotated, it will be impossible to close the contacts 83 due to insufficient time lapses to enable movement of the contact plate 84 into engagement therewith.

As progressively slower speeds are attained by corresponding slowing of the rotation of the propeller shaft 29 or other power source, the plunger arms 50 will each remain in contact with the actuator pin 63 for increasing periods of time so that, upon deceleration, a steady advancing movement of the actuator pin 63 radially outwardly of the casing under the influence of the springs 44 may be obtained. When the propeller shaft 29 is rotating at a sufficiently slow speed, pressures within the passages 67 and 66 become sufficiently equalized that the greater compressive strength of the spring 44 forces the contact plate 84 into contact with the electrical contacts 83, thereby closing the electrical circuit.

The operation of the device of Figure 10 is substantially identical with that above described.

It will thus be seen that the present invention provides a control device which is particularly accurate at relatively low speeds of operation. The device may be easily calibrated in any one of several ways. For example, one means of calibration is by means of the ratio of the gears 28 and 30 for driving the shaft 27, and another method of calibration is by changing the relative compressive strengths of the spring 44 with respect to the springs 65, 89 and 90. Still another calibration which is possible is to change the length of the cam lobe faces 55, and/or the number of cam lobes 54 so that a greater or less timed engagement of the plunger arms 50 with the actuating pin may be obtained. Of course, still another variation is provided by changing the structure of the damping valve, either by a variation in the size of the damping orifices 76 or by a change in the compressive strength of the value plate spring 75.

The control of automotive vehicular drive systems has long needed a device of this character which would provide for the operation of a switch or a valve at relatively low speeds in a manner which is accurate and yet flexible to be fitted into the characteristics of any desired application. In addition, the device is completely free of the variations inherent with centrifugal force.

The function of the device is dependent solely upon rotational movement of an element such as the illustrated rotor cam. When this element substantially stops rotating, the timed relation between the ability of the plunger springs 44 to close the switch (or open the valve), and the induction of air through the orifices 76 into the damping chamber 66 determines the moment of switch or valve actuation. When the cam 53 is turning, however slowly, air to equalize the pressure on the piston 64 cannot enter the chamber 66 in sufficient volume through the two extremely small orifices 76, under the influence of the plunger springs 44 prior to the subsequent engagement of another cam lobe with the active plunger, to withdraw the active plunger arm 50 from the end of the pin 63 to accommodate return movement of the piston 64 and the pin 63 under the influence of the return spring 65. Thus, under such conditions, the switch is maintained in substantially open condition as shown in Figure 9.

Solely, as a practical illustration of utilizing the advantages of the device of both Figures 1–9 and 10, the following example is submitted:

If the switch comprising the contacts 83 and the contact plate 84 controls a solenoid valve which in turn controls a vacuum-operated clutch cylinder unit operable to disengage a clutch and control the re-engagement thereof, as is well known in the art, the device may be utilized for controlling actuation of clutch disengagement in accordance with vehicular speeds. If the vehicle is moving at a speed of greater than five miles per hour, for example, the switch contacts are maintained open due to the rotational speed of the cam rotor, and the speed of actuation of the associated cam arms acting upon the actuating pin 63. If the vehicle now comes to a traffic light, the operator would release the accelerator and apply the brakes, and at the instant the vehicle rolls to a substantially stopped condition, the speed of the propeller shaft 29 will diminish with a consequent lessening of the speed of rotation of the control device shaft 27. Consequently, a plunger arm would instantly follow through and force the pin 63 radially outwardly from the casing 21 to its position as shown in Figure 3 to close the switch contacts and thus cause automatic clutch disengagement. In this manner clutch disengagement may be automatically caused to prevent stalling of the engine, while at the same time, a full utilization of the braking power of the engine is obtained at all vehicular speeds above substantially stopped condition.

Thus, it will be appreciated that very close control of the actuation of a switch or of a valve may be obtained without any variation due to centrifugal force components, and without the difficulty inherent in centrifugal-type speed-responsive devices heretofore utilized, which have been very inefficient at low speeds.

It will be understood that modifications and variations may be effected without departing from the scope of the novel concepts of the present invention as defined in the claims appended hereto.

I claim as my invention:

1. In a control device; a cam member rotatable at different speeds proportionate to an operatively connected variable-speed power source; a plurality of advanceable and retractable actuating means, the rotary movement of said cam member being effective to advance said actuating means; means biasing said actuating means to retract the same; a movable element having an extreme operative position; means biasing said element from said operative position when said actuating means is advanced, said element being urged toward said operative position upon retraction of said actuating means in opposition to the force of said last-named biasing means in response to substantially a non-rotational condition of said rotary cam member.

2. A control device as defined in claim 1 wherein the last-named biasing means is effective to move the said element into an inoperative position upon the said actuating means being advanced in response to rotation of said rotary cam member at or above a certain speed factor.

3. A control device as defined in claim 2 wherein the actuating means are alternately advanceable and retractable to influence the said movable element into and out of its said inoperative and operative positions, respectively, in response to rotation of said rotary cam member substantially at or above and below a predetermined speed factor.

4. In a control device; a cam member rotatable at different speeds proportionate to an operatively connected variable-speed power source; a plurality of alternately advanceable and retractable actuating means energizable by rotation of said cam member; a movable member having two extreme positions and reciprocable therebetween; fluid pressure damping means inhibiting movement of said member toward one of said positions and accommodating unrestricted movement of said member therefrom to the other of said positions; return means urging said member from said one position toward the other position in cooperation with the advancement of said actuating means in response to rotation of said rotary cam member at or above a certain speed factor.

5. In a control device; a cam member rotatable at different speeds proportionate to an operatively connected variable-speed power source; a plurality of alternately advanceable and retractable actuating means responsive to rotation of said cam member; a movable member having an extreme operative position and reciprocable toward and away from said operative position, said actuating means when advanced urging said member toward said operative position, return means effective on said member to urge the same from said operative position when said actuating means is retracted in response to speed conditions of said rotary cam member at or above a certain factor, and means for exerting a differential fluid pressure across said member during movement thereof toward said operative position to supplement said return means in opposing advancement of said actuating means.

6. In a control device, a cam member rotatable at different speeds proportionate to an operatively connected variable-speed power source; a movable member having an operative position; a plurality of alternately advanceable and retractable actuating means responsive to said rotary cam member for alternately accommodating movement of said movable member from said operative position and for causing movement of said member toward said operative positions; spring means effective on said actuating means to retract the same, for moving said member to said operative position; means defining a fluid pressure chamber adjacent said member; means carried by said member for reciprocation therewith and extending into said fluid pressure chamber; valve means for automatically differentiating the rates of fluid flow into and out of said chamber whereby said last-mentioned means is controllable by fluid flow into said chamber to retard movement of said member toward said operative position.

7. In a control device; a cam member rotatable at different speeds proportionate to an operatively connected variable-speed power source; a plurality of alternately advanceable and retractable actuating means controlled by rotation of said cam member, said actuating means including an actuating lever and spring means acting on said lever to advance the same; a movable member having an extreme operative position and reciprocable toward and away from said extreme position, said movable member being engaged by said lever when the same is advanced to urge said movable member toward said extreme position; means opposing movement of said movable member under the influence of said lever including a return spring acting on said member to urge the same from its extreme position, the biasing force of said lever spring means being greater than said return spring, and the combined force of said lever spring means exerted on said movable member decreasing as the speed of said cam member increases to or above a certain factor in response to said variable-speed power source.

8. In a control device; a cam member rotatable at different speeds proportionate to an operatively connected variable-speed power source; a plurality of alternately advanceable and retractable actuating means controlled by rotation of said cam member, said actuating means including an actuating lever and spring means acting on said lever to advance the same; a movable member having an extreme operative position and reciprocable toward and away from said extreme position, said movable member being engaged by said lever when the same is advanced to urge said movable member toward said extreme position; means opposing movement of said movable member under the influence of said lever including a return spring acting on said member to urge the same from its extreme position and fluid pressure damping means retarding movement of said movable member in one direction only, the biasing force of said lever spring means being greater than that of the return spring, and the combined force of said lever spring means exerted on said movable member decreasing as the speed of said cam member increases in response to said variable-speed power source.

9. In a control device; a cam member rotatable at different speeds proportionate to an operatively connected variable-speed power source; a plurality of alternately advanceable and retractable actuating means controlled by rotation of said cam member, said actuating means including an actuating lever and spring means acting on said lever to advance the same; a movable member having an extreme operative position and reciprocable toward and away from said extreme position, said movable member being engaged by said lever when the same is advanced to urge said movable member toward said extreme position; means opposing movement of said movable member under the influence of said lever including a return spring acting on said member to urge the same away from its extreme position and fluid pressure damping means retarding movement of said movable member toward said extreme position and accommodating unrestricted movement thereof under the influence of said return spring, the biasing force of said lever spring means being greater than that of the return spring, and the combined force of said lever spring means exerted on said movable member decreasing as the speed of said cam member increases.

10. A control device adapted to be driven by a variable-speed rotatable power source comprising a rotatable cam operatively connected to said power source, a plurality of spring-biased cam follower elements successively actuated by said cam during each rotative cycle thereof, striker arms operatively connected to said cam follower elements for successive actuation thereby, a movable pin contacted by each of said striker arms in succession during each rotation of said cam, said pin being urged by said arms toward an extreme operative position, and means opposing movement of said pin under the influence of said arms.

11. A control device adapted to be driven by a variable-speed rotatable power source comprising a rotatable cam operatively connected to said power source, a plurality of spring-biased cam follower elements successively actuated by said cam during each rotative cycle thereof, striker arms operatively connected to said cam follower elements for successive actuation thereby, a movable pin contacted by each of said striker arms in succession during each rotation of said cam, said pin being urged by said arms toward an extreme operative position, and means opposing movement of said pin under the influence of said arms, said means including a compression spring bottomed against said pin and compressed upon movement of said pin toward said extreme position.

12. A control device adapted to be driven by a variable-speed rotatable power source comprising a rotatable cam operatively connected to said power source, a plurality of spring-biased cam follower elements successively actuated by said cam during each rotative cycle thereof, striker arms operatively connected to said cam follower elements for successive actuation thereby, a movable pin contacted by each of said striker arms in succession during each rotation of said cam, said pin being urged by said arms toward an extreme operative position, and means opposing movement of said pin under the influence of said arms, said means including means defining a piston chamber adjacent said pin, a piston movable with said pin within said chamber, and means exerting a differential fluid pressure across said piston for damping movement of said pin toward its extreme position.

13. A control device adapted to be driven by a variable-speed rotatable power source comprising a rotatable cam operatively connected to said power source, a plurality of spring-biased cam follower elements successively actuated by said cam during each rotative cycle thereof, striker arms operatively connected to said cam follower elements for successive actuation thereby, a movable pin contacted by each of said striker arms in succession during each rotation of said cam, said pin being urged by said arms toward an extreme operative position, means opposing movement of said pin under the influence of said arms, said means including a compression spring bottomed against said pin and compressed upon movement of said pin toward said extreme position, means defining a piston chamber adjacent to and receiving said pin, a piston carried by said pin for movement therewith within said chamber, said piston dividing said piston chamber into isolated reactive and damping chambers on opposite sides thereof, means for venting said reactive chamber to atmospheric pressure, and means for generating less-than-atmospheric pressures in said damping chamber upon movement of said pin, the differential pressures across opposed sides of said piston damping pin movement toward said extreme position.

14. In a control device having a drive shaft adapted to be driven by a variable-speed rotatable power source; a multi-lobe cam journaled for rotation and operatively connected to said drive shaft for rotation therewith, a pair of opposed cam followers contacting said cam, means biasing said followers toward said cam and accommodating alternate reciprocation of said followers upon engagement of the same with said cam lobes, striker members having angularly disposed arms linked to said followers for alternate advancement and retraction as said followers are reciprocated, and an actuating pin urged toward an extreme position by said striker members when the arms thereof are advanced and free for movement from said extreme position when said arms are retracted.

15. In a control device having a drive shaft adapted to be driven by a variable-speed rotatable power source; a multi-lobe cam journaled for rotation and operatively connected to said drive shaft for rotation therewith, a pair of opposed cam followers contacting said cam, means biasing said followers toward said cam and accommodating alternate reciprocation of said followers upon engagement of the same with said cam lobes, striker members having angularly disposed arms linked to said followers for alternate advancement and retraction as said followers are reciprocated, an actuating pin having one end adjacent said arms for engagement therewith upon advancement thereof to urge said pin to an operative position, and means acting directly on said pin resisting movement thereof toward said position and tending to urge said pin from said position upon retraction of said arms.

16. In a control device having a drive shaft adapted to be driven by a variable-speed rotatable power source; a multi-lobe cam journaled for rotation and operatively connected to said drive shaft for rotation therewith, a pair of opposed cam followers contacting said cam, means biasing said followers toward said cam and accommodating alternate reciprocation of said followers upon engagement of the same with said cam lobes, striker members having angularly disposed arms linked to said followers for alternate advancement and retraction as said followers are reciprocated, the frequency of said advancement and retraction being directly proportional to the speed of rotation of said cam, an actuating pin having one end adjacent said arms for engagement therewith upon advancement thereof to urge said pin to an operative position, and means acting directly on said pin resisting movement thereof toward said position and tending to urge said pin from said position upon retraction of said arms, said means including means defining a fluid pressure space, an air impermeable barrier movable with said pin in said space, and means for subjecting said barrier to differential fluid pressures within said space to oppose movement of said pin to said extreme position.

17. In a control device having a rotary shaft responsive to a variable-speed power source; an actuable member mounted for reciprocation toward and away from an extreme operative position, means comprising a cam rotated by the said shaft for successively reciprocating said member by the rotary movement only of said cam, means rendered effective during movement of said member away from said operative position to resist movement of said member toward said operative position at substantially non-rotational condition of said rotary shaft, and means operable automatically for controlling the effectiveness of said last-named means.

18. In a control device having a rotary shaft responsive to a variable-speed power source; an actuating member mounted for reciprocation toward and away from an extreme operative position; means comprising a cam rotated by the said shaft for successively reciprocating said member by the rotary movement only of said cam; and means effective to resist movement of said member toward said operative position, including an enclosed fluid pressure space, means carried by said member for reciprocation therewith within said space and adapted to divide the same into a pair of isolated fluid pressure chambers, and means for introducing fluid under different pressures into said chambers, at substantially a non-rotational condition of said rotary shaft.

19. In a control device having driving means responsive to a variable-speed source; an actuating member mounted for reciprocation toward and away from an extreme operative position, means actuated by said driving means for reciprocating said member, and means resisting movement of said member toward said operative position, including an enclosed fluid pressure space surrounding a portion of said actuating member, a piston carried by said member for reciprocation therewith within said space and dividing said space into a pair of isolated chambers, means venting one of said chambers to atmospheric pressure, and means for generating a less-than-atmospheric pressure in the other of said chambers.

20. In a control device having driving means responsive to a variable-speed source; an actuating member mounted for reciprocation toward and away from an extreme operative position, means actuated by said driving means for reciprocating said member, and means resisting movement of said member toward said operative position, including an enclosed fluid pressure space surrounding a portion of said actuating member, a piston carried by said member for reciprocation therewith within said space and dividing said space into a pair of isolated chambers, means venting one of said chambers to atmospheric pressure, and means for generating a less-than-atmospheric pressure in the other of said chambers, said last-mentioned means including a slidable valve plate having reduced orifices for limiting the flow of atmospheric air into said other chamber upon movement of said member toward its operative position and for accommodating relatively free flow of air therefrom upon movement of said member from its operative position.

References Cited in the file of this patent

UNITED STATES PATENTS

| Number | Name | Date |
|---|---|---|
| 606,425 | Maxim | June 28, 1898 |
| 1,012,025 | Stier | Dec. 19, 1911 |
| 1,154,062 | Samuelson | Sept. 21, 1915 |
| 1,585,529 | Boving | May 18, 1926 |
| 2,333,184 | Kalin | Nov. 2, 1943 |
| 2,371,793 | Bourland et al. | Mar. 20, 1945 |
| 2,480,707 | Britton | Aug. 30, 1949 |

FOREIGN PATENTS

| Number | Country | Date |
|---|---|---|
| 581,268 | France | Nov. 26, 1924 |
| 332,008 | Great Britain | July 17, 1930 |